United States Patent
Kadam et al.

(10) Patent No.: US 11,060,374 B2
(45) Date of Patent: Jul. 13, 2021

(54) SWELLABLE PACKERS AND METHODS FOR ACTIVATING SWELLABLE PACKERS IN A DOWNHOLE ENVIRONMENT

(71) Applicant: Halliburton Energy Services, Inc., Houston, TX (US)

(72) Inventors: Sunita Sameer Kadam, Pune (IN); Vaishali Mishra, Pune (IN); Rahul Chandrakant Patil, Pune (IN); Mohamed A. Salam, Pune (IN); Ravikant S. Belakshe, Pune (IN); Siddharth Roy, Pune (IN); Vilas Ramtenki, Pune (IN)

(73) Assignee: Halliburton Energy Services, Inc., Houston, TX (US)

(*) Notice: Subject to any disclaimer, the term of this patent is extended or adjusted under 35 U.S.C. 154(b) by 175 days.

(21) Appl. No.: 16/480,092

(22) PCT Filed: Feb. 20, 2018

(86) PCT No.: PCT/US2018/018846
§ 371 (c)(1),
(2) Date: Jul. 23, 2019

(87) PCT Pub. No.: WO2018/169654
PCT Pub. Date: Sep. 20, 2018

(65) Prior Publication Data
US 2019/0376363 A1    Dec. 12, 2019

Related U.S. Application Data

(60) Provisional application No. 62/472,432, filed on Mar. 16, 2017, provisional application No. 62/472,442, filed on Mar. 16, 2017.

(51) Int. Cl.
*E21B 33/13* (2006.01)
*C09K 8/44* (2006.01)
(Continued)

(52) U.S. Cl.
CPC ............... *E21B 33/13* (2013.01); *C09K 8/44* (2013.01); *E21B 29/02* (2013.01); *E21B 33/12* (2013.01)

(58) Field of Classification Search
CPC .......... E21B 33/13; E21B 29/02; E21B 33/12; C09K 8/44
See application file for complete search history.

(56) References Cited

U.S. PATENT DOCUMENTS

| 4,635,726 A | 1/1987 | Walker |
| 6,153,669 A | 11/2000 | Diggs et al. |

(Continued)

FOREIGN PATENT DOCUMENTS

| RU | 2500711 C2 | 12/2013 |
| RU | 2540068 C2 | 1/2015 |

(Continued)

OTHER PUBLICATIONS

International Search Report and Written Opinion dated Jul. 2, 2018 for PCT/US2018/018846 filed Feb. 20, 2018 (15 pages).

*Primary Examiner* — Crystal J Miller
(74) *Attorney, Agent, or Firm* — Chamberlain Hrdlicka

(57) ABSTRACT

Methods for producing a swellable packer in a downhole environment are provided. A method includes introducing a treatment fluid containing a polymeric composition into a wellbore within the downhole environment and exposing the polymeric composition to an acid to produce a swollen polymeric material within the downhole environment. The polymeric composition contains a reaction product of at least one or more monomers, one or more comonomers, and one or more crosslinkers. The acid can be in situ formed from an acid precursor introduced into the downhole environment.

20 Claims, 2 Drawing Sheets

(51) Int. Cl.
  *E21B 29/02* (2006.01)
  *E21B 33/12* (2006.01)

(56) References Cited

U.S. PATENT DOCUMENTS

| | | |
|---|---|---|
| 6,454,003 B1 | 9/2002 | Chang |
| 6,562,762 B2 | 5/2003 | Cowan et al. |
| 6,667,279 B1 * | 12/2003 | Hessert .................. C08L 1/26 507/225 |
| 7,143,832 B2 | 12/2006 | Freyer |
| 7,341,106 B2 | 3/2008 | Reddy et al. |
| 8,685,903 B2 | 4/2014 | Ravi et al. |
| 2011/0253393 A1 | 10/2011 | Vaidya et al. |
| 2011/0290472 A1 | 12/2011 | Doweidt et al. |
| 2013/0075096 A1 * | 3/2013 | Khalfallah .............. E21B 33/14 166/294 |
| 2014/0090844 A1 | 4/2014 | Daou et al. |
| 2014/0110119 A1 | 4/2014 | Luyster et al. |
| 2014/0353042 A1 | 12/2014 | Karale et al. |
| 2015/0275617 A1 | 10/2015 | Lou et al. |
| 2017/0015824 A1 | 1/2017 | Gazalo et al. |

FOREIGN PATENT DOCUMENTS

| | | | |
|---|---|---|---|
| WO | 2016022093 A1 | 2/2016 | |
| WO | 2016053237 A1 | 4/2016 | |
| WO | WO-2016053237 A1 * | 4/2016 | ............ C08F 220/34 |
| WO | 2017048222 A1 | 3/2017 | |

* cited by examiner

SWELLABLE PACKERS AND METHODS FOR ACTIVATING SWELLABLE PACKERS IN A DOWNHOLE ENVIRONMENT

BACKGROUND

This section is intended to provide relevant background information to facilitate a better understanding of the various aspects of the described embodiments. Accordingly, it should be understood that these statements are to be read in this light and not as admissions of prior art.

Swellable packers are used for well completion and construction and are often used to isolate sections of the wellbore from one another, particularly those sections adjacent different hydrocarbon producing formations. Swellable packers are also used to seal or plug fractures or other forms of porosity within a subterranean formation in order to reduce or eliminate fluid loss during an operation. For swellable packers, the swell rate, swell percentage, and the relative hardness of the swellable element are relevant properties to control for assuring sufficient engagement with the wellbore wall or fracture in the subterranean formation. The swelling of the swellable packer is traditionally triggered by the use of hydrocarbon, water, or combination of both. However, these traditional triggers commonly exist in a downhole environment and therefore present challenges to controlling the timing of the swelling of the swellable packer.

Therefore, there is a need for a swellable packer that isolates sections of the wellbore and seals the porosity of subterranean formations, but is also controllable to be activated at a desired time and location.

BRIEF DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
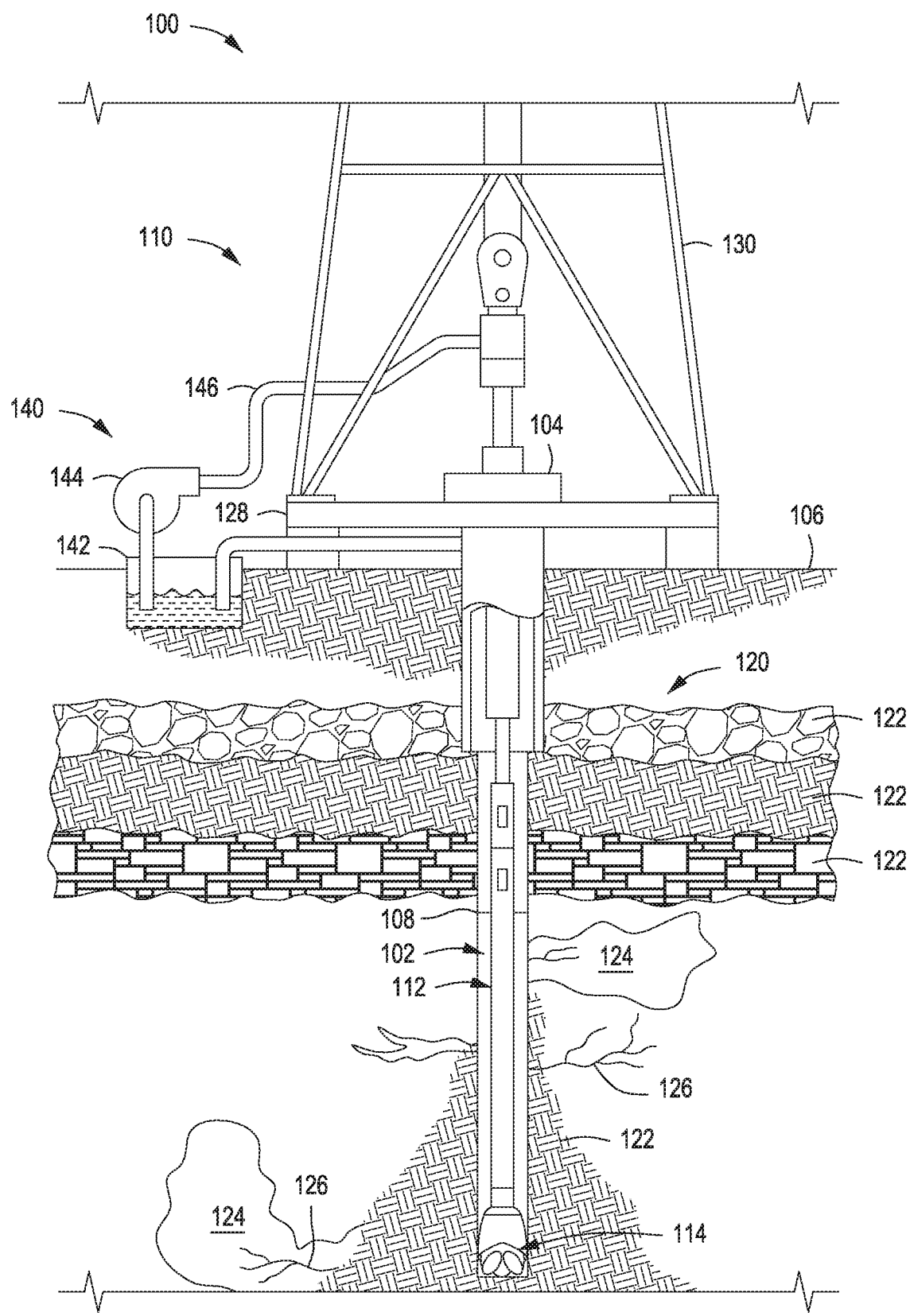
FIG. 1 is a schematic view of a drilling system containing a delivery system that is used to introduce a treatment fluid into a downhole environment, according to one or more embodiments.

Embodiments provide compositions of swellable packers and methods for using the swellable packers in downhole environments. FIG. 1 depicts a schematic view of a drilling operation deployed using a drilling system 100, according to one or more embodiments. The drilling system 100 is located in and around a wellbore 102 and on a ground surface 106. The wellbore 102 is formed within a subterranean region 120 beneath the ground surface 106. The wellbore 102 contains one or more fluids 108, such as drilling fluid, production fluids, fracturing fluids, other downhole or annular fluids, or any combination thereof.

The subterranean region 120 includes all or part of one or more subsurface layers 122, one or more subterranean formations 124, subterranean zones, and/or other earth formations. The subterranean region 120 shown in FIG. 1, for example, includes multiple subsurface layers 122 and subterranean formations 124. Fractures 126, and other types of cracks, are formed throughout the subsurface layers 122 and the subterranean formations 124. The subsurface layers 122 can include sedimentary layers, rock layers, sand layers, or any combination thereof and other types of subsurface layers. One or more of the subsurface layers 122 can contain fluids, such as brine, oil, gas, or combinations thereof. The wellbore 102 penetrates and extends through the subsurface layers 122. Although the wellbore 102 shown in FIG. 1 is a vertical wellbore, the drilling system 100 can also be implemented in other wellbore orientations. For example, the drilling system 100 may be adapted for horizontal wellbores, slant wellbores, curved wellbores, vertical wellbores, or any combination thereof.

A drilling rig 110 includes a platform 128 located above the surface 106 equipped with a derrick 130 that supports a rotatable tool or a drill string 112 extending through a wellhead 104 and into the wellbore 102. The drill string 112 is operated to drill the wellbore 102 while penetrating the subterranean region 120. The drill string 112 can be or include, but is not limited to, one or more drill pipes (e.g., jointed drill pipe, hard wired drill pipe, or other deployment hardware), tubulars, coiled tubings, slicklines, wireline cables, tractors, a kelly, a bottom hole assembly (BHA), other conveyance devices, or any combination thereof. For example, drilling can be performed using a string of drill pipes connected together to form the drill string 112 that is lowered through a rotary table (not shown) at the wellhead 104 into the wellbore 102. The BHA on the drill string 112 can include, but is not limited to, one or more of drill collars, drill bits 114, sensors, logging tools, other components, and/or any combination thereof. For example, the drill string 112 includes one or more drill bits 114 at the downhole end.

The drilling system 100 includes a delivery system 140 that is used to deliver or otherwise introduce one or more treatment fluids containing a polymeric composition into a downhole environment, such as the wellbore 102, the subterranean formation 124, and the fractures 126, according to one or more embodiments. The delivery system 140 includes one or more containers 142, one or more pumps 144, and one or more pipes 146. The container 142 can contain one or more treatment fluids that can be produced, stirred, mixed, stored, delivered, or any combination thereof within the container 142. For example, the treatment fluid, used to produce a swellable packer, can include one or more polymeric compositions, one or more carrier fluids or brines, and one or more acids or acid precursors. In one or more examples, the polymeric composition of the swellable packer contains one or more monomers, one or more comonomers, and one or more crosslinkers.

The polymeric composition, the carrier fluid or brine, and the acid or acid precursor are combined to produce the treatment fluid prior to placing the treatment fluid into the subterranean formation. For example, the treatment fluid is produced offsite of the delivery system 140 and subsequently introduced or otherwise added into the container 142. In other examples, one or more components of the treatment fluid are mixed or otherwise combined to produce the treatment fluid onsite of the delivery system 140, such as in the container 142. Thereafter, the treatment fluid is stored until ready to be used, such as to be introduced downhole and activated to produce the swellable packer. The container 142 can be, but is not limited to, one or more tanks, vessels, columns, or reactors and can include one or more mixing devices and one or more heat control devices.

The treatment fluid is conveyed or otherwise transported from the container 142 via pipe 146 to the wellhead 104, where the treatment fluid is introduced into the drill string 112. The drill string 112 extends from the wellhead 104 into one or more boreholes or wellbores 102 and the subterranean formation 124 each formed in the subterranean region 120. Although the wellbore 102 shown in FIG. 1 is a vertical wellbore, the treatment fluid can also be used in wellbore having other orientations. For example, the treatment fluid can be introduced into horizontal wellbores, slant wellbores, curved wellbores, vertical wellbores, or any combination thereof. It should be noted that while FIG. 1 generally depicts a land-based system, it is to be recognized that like systems can be operated in subsea locations as well.

The pump 144 is coupled to and in fluid communication with the container 142 and the pipe 146, as shown in FIG. 1. The pump 144 transports the treatment fluid from the container 142, through the pipe 146 and the drill string 112, and into the wellbore 102, the subterranean formation 124, and/or the fractures 126. The pump 144 can also be used to control the pressure within the wellbore 102, the subterranean formation 124, and other portions of the subterranean region 120.

The treatment fluid is flowed into the wellbore 102 and contained within the wellbore 102 and/or the subterranean formation 124. Upon being introduced, ejected, or otherwise exiting from the drill string 112, the treatment fluid subsequently penetrates into fractures 126, including cracks, holes, passageways, and other forms of porosity within the subterranean formation 124. The subterranean formation 124 can be or include, but is not limited to one or more carbonate formations.

It is to be recognized that the delivery system 140 is merely exemplary in nature and various additional components can be present that have not necessarily been depicted in FIG. 1 in the interest of clarity. Non-limiting additional components that can be present include, but are not limited to, supply hoppers, mixing devices, valves, condensers, adapters, joints, gauges, sensors, pumps, compressors, pressure controllers, pressure sensors, flow rate controllers, flow rate sensors, temperature sensors, or temperature control devices.

Treatment Fluid

In one or more embodiments, the treatment fluid includes a swellable packer containing one or more polymeric compositions, one or more carrier fluids or brines, and one or more acids or acid precursors. The polymeric composition of the swellable packer contains a reaction product of at least one or more monomers, one or more comonomers, and one or more crosslinkers.

The monomer and the comonomer are acid responsive monomers that include one or more basic functional groups and one or more alkenes (e.g., mono-vinyl monomers) or alkynes. The basic functional groups can be or include, but are not limited to one or more amines, amides, salts thereof, or any combination thereof. The alkene and/or alkyne are typically a hydrocarbyl group containing one, two, or more unsaturated bonds, such as a diene or an olefin. In some examples, the monomer and/or comonomer can also include one or more alkene, such as methylene.

In one or more embodiments, the monomer has the chemical formula:

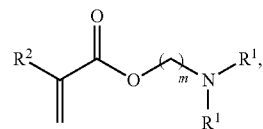

where each $R^1$ and $R^2$ is independently a substituted or unsubstituted linear, branched, cyclic, heterocyclic, or aromatic hydrocarbyl group and m is an integral of 1, 2, 3, 4, 5, 6, 7, 8, 9, or 10. In some examples, each $R^1$ and $R^2$ is independently a $C_1$-$C_{10}$ alkyl and m is an integral in a range from 1 to 8. In other examples, each $R^1$ and $R^2$ is independently a $C_1$-$C_5$ alkyl and m is an integral in a range from 1 to 5. The $C_1$-$C_{10}$ alkyl can be methyl, ethyl, propyl, butyl, pentyl, hexyl, heptyl, octyl, nonyl, or decyl. In one or more examples, each $R^1$ is independently a $C_1$-$C_{10}$ alkyl, $R^2$ is a substituted or unsubstituted linear, branched, cyclic, heterocyclic, or aromatic hydrocarbyl group, and m is an integral in a range from 1 to 5. In some examples when m is 2, the monomer includes a dialkylaminoethyl group and the monomer has the chemical formula:

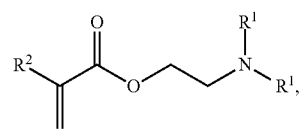

where each $R^1$ is independently a $C_1$-$C_5$ alkyl and $R^2$ is a $C_1$-$C_5$ alkyl, a phenyl, or an aryl. The monomer can include shorter alkyls such that each $R^1$ and $R^2$ is independently a $C_1$-$C_3$ alkyl, such as, methyl, ethyl, or propyl. In a specific example, each $R^1$ and $R^2$ is methyl and the monomer is N,N-dimethylaminoethyl methacrylate (DMAEMA) having the chemical formula:

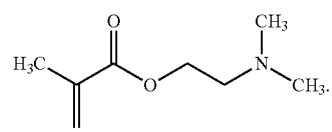

In one or more embodiments, the comonomer can be an alkene or mono-vinyl with the chemical formula $R^3$—CH=$CH_2$, where $R^3$ is a substituted or unsubstituted linear, branched, cyclic, heterocyclic, or aromatic hydrocarbyl group. In one or more examples, $R^3$ is a phenyl, an aryl, or a $C_1$-$C_{10}$ alkyl. For example, $R^3$ is a phenyl and the comonomer is styrene. In other examples, $R^3$ is an aryl and the comonomer is a functionalized styrene.

In some embodiments, each of the monomer and the comonomer can independently be or include, but is not limited to, one or more of alkyl acrylates, alkyl methacrylates, cyclohexyl acrylates, cyclohexyl methacrylates, aryl acrylates, aryl methacrylates, aminoalkyl acrylates, aminoalkyl methacrylates, alkyl vinyl ethers, styrene, acrylonitrile, 2-vinyl pyridine, 4-vinyl pyridine, and vinyl acetate, salts thereof, derivatives thereof, or any combination thereof.

The crosslinker includes two or more functional groups for cross-linking with the monomer and/or comonomer. The crosslinker can include one, two, or more alkenes (e.g., mono-vinyl monomers) and/or one, two, or more alkynes. In one or more embodiments, the crosslinker be or include, but is not limited to, one or more di-vinyl monomers, tri-vinyl monomers, tetra-vinyl monomers, other multi-vinyl monomers or compounds, or any combination thereof. For example, the crosslinker be or include, but is not limited to, alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, allyl acrylate, triacrylate (trimethylolpropane triacrylate), trimethacrylate (trimethylolpropane trimethacrylate), salts thereof, derivatives thereof, or any combination thereof.

In one or more embodiments, the crosslinker has the chemical formula:

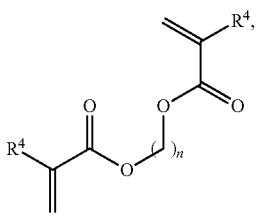

where each $R^4$ is independently a substituted or unsubstituted linear, branched, cyclic, heterocyclic, or aromatic hydrocarbyl group and n is an integral of 1, 2, 3, 4, 5, 6, 7, 8, 9, or 10. In some examples, each $R^4$ is independently a $C_1$-$C_{10}$ alkyl, a phenyl, or an aryl and n is an integral in a range from 1 to 5. In other examples, each $R^4$ is independently a $C_1$-$C_5$ alkyl, a phenyl, or an aryl and n is an integral in a range from 1 to 3.

In some examples when n is 2, the crosslinker includes an ethylene glycol motif and has the chemical formula:

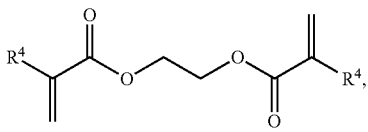

where each $R^4$ is independently a $C_1$-$C_5$ alkyl, a phenyl, or an aryl. The crosslinker can include shorter alkyls such that each $R^4$ is independently a $C_1$-$C_3$ alkyl, such as, methyl, ethyl, or propyl. In a specific example, each $R^4$ is methyl and the crosslinker is ethylene glycol dimethacrylate (EGDMA) having the chemical formula:

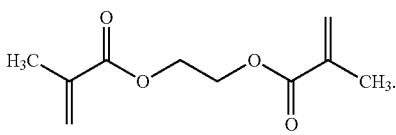

The polymeric composition of the swellable packer contains a reaction product of at least the monomer, the comonomer, and the crosslinker. The polymeric composition includes the monomer in an amount of about 50 mol %, about 55 mol %, about 60 mol %, about 65 mol %, or about 70 mol % to about 75 mol %, about 80 mol %, about 85 mol %, about 90 mol %, about 95 mol %, or about 97 mol %, based on the total moles of the monomer, the comonomer, and the crosslinker. For example, the polymeric composition includes the monomer in an amount of about 50 mol % to about 97 mol %, about 55 mol % to about 95 mol %, about 60 mol % to about 95 mol %, about 65 mol % to about 95 mol %, about 70 mol % to about 95 mol %, about 75 mol % to about 95 mol %, about 80 mol % to about 95 mol %, about 55 mol % to about 90 mol %, about 60 mol % to about 90 mol %, about 65 mol % to about 90 mol %, about 70 mol % to about 90 mol %, about 75 mol % to about 90 mol %, about 80 mol % to about 90 mol %, about 55 mol % to about 85 mol %, about 60 mol % to about 85 mol %, about 65 mol % to about 85 mol %, about 70 mol % to about 85 mol %, about 75 mol % to about 85 mol %, about 80 mol % to about 85 mol %, about 70 mol % to about 80 mol %, about 75 mol % to about 80 mol %, about 75 mol % to about 82 mol %, or about 75 mol % to about 85 mol %, based on the total moles of the monomer, the comonomer, and the crosslinker.

The polymeric composition includes the comonomer in an amount of about 5 mol %, about 8 mol %, about 10 mol %, about 12 mol %, or about 15 mol % to about 18 mol %, about 20 mol %, about 25 mol %, about 30 mol %, about 35 mol %, or about 40 mol %, based on the total moles of the monomer, the comonomer, and the crosslinker. For example, the polymeric composition includes the comonomer in an amount of about 5 mol % to about 40 mol %, about 10 mol % to about 40 mol %, about 10 mol % to about 35 mol %, about 10 mol % to about 30 mol %, about 10 mol % to about 25 mol %, about 10 mol % to about 20 mol %, about 10 mol % to about 15 mol %, about 12 mol % to about 40 mol %, about 12 mol % to about 35 mol %, about 12 mol % to about 30 mol %, about 12 mol % to about 25 mol %, about 12 mol % to about 20 mol %, about 12 mol % to about 15 mol %, about 15 mol % to about 40 mol %, about 15 mol % to about 35 mol %, about 15 mol % to about 30 mol %, about 15 mol % to about 25 mol %, about 15 mol % to about 20 mol %, or about 15 mol % to about 18 mol %, based on the total moles of the monomer, the comonomer, and the crosslinker.

The polymeric composition includes the crosslinker in an amount of about 0.1 mol %, about 0.5 mol %, about 0.8 mol %, about 1 mol %, or about 1.2 mol % to about 1.5 mol %, about 1.8 mol %, about 2 mol %, about 2.5 mol %, about 3 mol %, about 3.5 mol %, about 4 mol %, about 4.5 mol %, about 5 mol %, about 6 mol %, or about 8 mol %, based on the total moles of the monomer, the comonomer, and the crosslinker. For example, the polymeric composition includes the crosslinker in an amount of about 0.1 mol % to about 8 mol %, about 0.1 mol % to about 5 mol %, about 0.5 mol % to about 5 mol %, about 0.5 mol % to about 4 mol %, about 0.5 mol % to about 3.5 mol %, about 0.5 mol % to about 3 mol %, about 0.5 mol % to about 2.5 mol %, about 0.5 mol % to about 2.2 mol %, about 0.5 mol % to about 2 mol %, about 0.5 mol % to about 1.5 mol %, about 0.5 mol % to about 1 mol %, about 0.8 mol % to about 5 mol %, about 0.8 mol % to about 4 mol %, about 0.8 mol % to about 3.5 mol %, about 0.8 mol % to about 3 mol %, about 0.8 mol % to about 2.5 mol %, about 0.8 mol % to about 2.2 mol %, about 0.8 mol % to about 2 mol %, about 0.8 mol % to about 1.5 mol %, about 1 mol % to about 5 mol %, about 1 mol % to about 4 mol %, about 1 mol % to about 3.5 mol %, about 1 mol % to about 3 mol %, about 1 mol % to about 2.5 mol %, about 1 mol % to about 2.2 mol %, about 1 mol % to about 2 mol %, about 1 mol % to about 1.5 mol %, about 1.5 mol % to about 5 mol %, about 1.5 mol % to about 4 mol %, about 1.5 mol % to about 3.5 mol %, about 1.5 mol % to about 3 mol %, about 1.5 mol % to about 2.5 mol %, about 1.5 mol % to about 2.2 mol %, about 1.5 mol % to about 2 mol %, or about 1.5 mol % to about 1.8 mol %, based on the total moles of the monomer, the comonomer, and the crosslinker.

In one or more examples, the polymeric composition is produced by reacting together about 65 mol % to about 90 mol % of the monomer, about 10 mol % to about 30 mol % of the comonomer, and about 0.5 mol % to about 5 mol % of the crosslinker. In other examples, the polymeric composition is produced by reacting together about 75 mol % to about 82 mol % of the monomer, about 15 mol % to about 25 mol % of the comonomer, and about 1 mol % to about 3 mol % of the crosslinker. In other examples, the polymeric composition is produced by reacting together about 76 mol % to about 80 mol % of the monomer, about 18 mol % to about 22 mol % of the comonomer, and about 1.5 mol % to about 2.5 mol % of the crosslinker.

The polymeric composition can be produced by reacting the monomer, the comonomer, the crosslinker, and one or more radical initiators. The radical initiator, or a portion thereof, can be incorporated into the polymeric composition. Alternatively, the radical initiator can remain unincorporated into the polymeric composition. For example, the radical initiator can be or include a catalyst. In one or more examples, the radical initiator can be or include, but are not limited to one or more azo compounds, peroxides, persulfates, or any combination thereof. Exemplary radical initiators can be or include, but are not limited to one or more azobisisobutyronitrile (AIBN) that has the chemical formula $[(CH_3)_2C(CN)]_2N_2$, benzoyl peroxide, potassium persulfate, salts thereof, or any combination thereof.

The radical initiator can be combined with the monomer, the comonomer, and the crosslinker in an amount of about 0.1 mol %, about 0.2 mol %, about 0.3 mol %, about 0.4 mol %, or about 0.5 mol % to about 0.6 mol %, about 0.8 mol %, about 1 mol %, about 1.5 mol %, about 2 mol %, about 2.5 mol %, about 3 mol %, about 4 mol %, about 5 mol %, or more of the radical initiator, based on the total moles of the monomer, the comonomer, and the crosslinker. For example, the radical initiator can be combined with the monomer, the comonomer, and the crosslinker in an amount of about 0.1 mol % to about 5 mol %, about 0.2 mol % to about 5 mol %, about 0.2 mol % to about 4 mol %, about 0.2 mol % to about 3 mol %, about 0.2 mol % to about 2 mol %, about 0.2 mol % to about 1 mol %, about 0.5 mol % to about 5 mol %, about 0.5 mol % to about 4 mol %, about 0.5 mol % to about 3 mol %, about 0.5 mol % to about 2 mol %, about 0.5 mol % to about 1 mol %, about 0.8 mol % to about 4 mol %, about 0.8 mol % to about 3 mol %, about 0.8 mol % to about 2 mol %, or about 0.8 mol % to about 1 mol % of the radical initiator, based on the total moles of the monomer, the comonomer, and the crosslinker.

Besides the polymeric composition, the treatment fluid also includes one or more carrier fluids or brines and one or more acids or acid precursors. The treatment fluid is an aqueous solution and can include one or more salts contained therein. Other aqueous fluids, such as drilling fluids, wellbore fluids, or brines, contain salts and can be combined with the treatment fluid. The treatment or aqueous fluid can include, but is not limited to, fresh water, sea water, water containing organic and/or inorganic dissolved salts, liquids containing water-miscible organic compounds, solvents, or any combination thereof. For example, the treatment or aqueous fluid can be formulated with mixtures of desired salts in fresh water. Salts dissolved in the treatment or aqueous fluid can include, but are not limited to, alkali metal and/or alkaline earth halides, hydroxides, and/or carboxylates, for example.

The treatment or aqueous fluid can include, but is not limited to, one or more salts of sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that can be incorporated in the treatment or aqueous fluid include any one or more of those present in natural seawater or any other organic or inorganic dissolved salts. Additionally, aqueous fluids that may be used in the treatment or aqueous fluid can be natural or synthetic brines, with synthetic brines tending to be much simpler in constitution. Exemplary salts can be or include, but are not limited to, one or more of sodium chloride (NaCl), sodium bromide (NaBr), potassium chloride (KCl), potassium bromide (KBr), cesium chloride (CsCl), cesium bromide (CsBr), calcium chloride ($CaCl_2$), calcium bromide ($CaBr_2$), zinc chloride ($ZnCl_2$), zinc bromide ($ZnBr_2$), magnesium chloride ($MgCl_2$), magnesium bromide ($MgBr_2$), sodium hydrogen carbonite ($NaHCO_2$), potassium hydrogen carbonite ($KHCO_2$), cesium hydrogen carbonite ($CsHCO_2$), ammonium chloride ($NH_4Cl$), ammonium bromide ($NH_4Br$), sodium acetate ($NaO_2CCH_3$), potassium acetate ($KO_2CCH_3$), hydrates thereof, or any combinations thereof.

The treatment or aqueous fluid includes a concentration of salt from about 0.01 wt %, about 0.05 wt %, about 0.1 wt %, about 0.5 wt %, about 0.8 wt %, about 1 wt %, about 1.5 wt %, or about 2 wt % to about 2.5 wt %, about 3 wt %, about 3.5 wt %, about 4 wt %, about 4.5 wt %, about 5 wt %, about 6 wt %, about 7 wt %, about 8 wt %, about 9 wt %, about 10 wt %, about 12 wt %, about 15 wt %, about 20 wt %, or more, relative to the total weight of the treatment or aqueous fluid. For example, the treatment or aqueous fluid includes a concentration of salt from about 0.01 wt % to about 20 wt %, about 0.1 wt % to about 20 wt %, about 0.5 wt % to about 20 wt %, about 1 wt % to about 20 wt %, about 2 wt % to about 20 wt %, about 3 wt % to about 20 wt %, about 4 wt % to about 20 wt %, about 5 wt % to about 20 wt %, about 7 wt % to about 20 wt %, about 10 wt % to about 20 wt %, about 1 wt % to about 10 wt %, about 2 wt % to about 10 wt %, about 3 wt % to about 10 wt %, about 4 wt % to about 10 wt %, about 5 wt % to about 10 wt %, or about 7 wt % to about 10 wt %.

In one or more embodiments, the treatment fluid can be placed into the downhole environment as an acidic solution. The polymeric composition reacts with the acid to produce the swollen polymeric material at a rate that the polymeric composition is positioned at the predetermined location within the downhole environment prior to being completely swelled by the acidic treatment fluid. In other embodiments, the treatment fluid can be a relatively neutral solution containing one or more acid precursors that are activated downhole to in situ produce the acid, reduce the pH of the treatment or other downhole fluid, and produce the swollen polymeric material at the predetermined location within the downhole environment.

Regardless if the acid is in the treatment fluid, added directly to the predetermined location within the downhole environment, and/or generated in situ downhole from the acid precursor, the acid can be or include one or more organic acids, one or more inorganic acids, or a combination thereof. Exemplary organic acids can be or include, but are not limited to one or more of formic acid, acetic acid, propionic acid, butyric acid, valeric acid, critic acid, oxalic acid, lactic acid, malic acid, uric acid, glutaric acid, glutamic acid, glycolic acid, malonic acid, tartaric acid, adipic acid, sulfamic acid, chloroacetic acid, phthalic acid, benzoic acid, a sulfonic acid, a phosphonic acid, salts thereof, esters thereof, or any combination thereof. Exemplary inorganic acids can be or include, but are not limited to one or more of hydrochloric acid, perchloric acid, sulfuric acid, sulfurous acid, phosphoric acid, phosphorous acid, hypophosphorous acid, hydrofluoric acid, hydrobromic acid, nitric acid, salts thereof, esters thereof, or any combination thereof.

In one or more embodiments, the treatment fluid is an acidic solution during the swelling process to produce the swollen polymeric material from the polymeric composition. The treatment fluid has a pH of less 5, less than 4, or less than 3. The treatment fluid can have a pH of about −0.5, about −0.2, about 0, about 0.2, about 0.5, about 0.8, or about 1 to about 1.2, about 1.5, about 1.8, about 2, about 2.2, about 2.5, about 2.8, about 3, about 3.2, about 3.5, about 3.8, about 4, about 4.5, or about 5. For example, the treatment fluid can have a pH of about −0.5 to about 5, about −0.5 to about 4, about −0.5 to about 3, about −0.5 to about 2, about −0.5 to about 1.8, about −0.5 to about 1.5, about −0.5 to about 1.2, about −0.5 to about 1, about −0.5 to about 0.8, about −0.5 to about 0.5, about 0.5 to about 5, about 0.5 to about 4, about 0.5 to about 3, about 0.5 to about 2, about 0.5 to about 1.8, about 0.5 to about 1.5, about 0.5 to about 1.2, about 0.5 to about 1, about 0.5 to about 0.8, about 0.8 to about 5, about 0.8 to about 4, about 0.8 to about 3, about 0.8 to about 2, about 0.8 to about 1.8, about 0.8 to about 1.5, about 0.8 to about 1.2, about 0.8 to about 1, about 1 to about 5, about 1 to about 4, about 1 to about 3, about 1 to about 2, about 1 to about 1.8, about 1 to about 1.5, or about 1 to about 1.2.

In other examples, the treatment fluid can have a pH of about −0.5 to less than 5, about −0.5 to less than 4, about −0.5 to less than 3, about −0.5 to less than 2, about −0.5 to less than 1.8, about −0.5 to less than 1.5, about −0.5 to less than 1.2, about −0.5 to less than 1, about −0.5 to less than 0.8, about −0.5 to less than 0.5, about 0.5 to less than 5, about 0.5 to less than 4, about 0.5 to less than 3, about 0.5 to less than 2, about 0.5 to less than 1.8, about 0.5 to less than 1.5, about 0.5 to less than 1.2, about 0.5 to less than 1, about 0.5 to less than 0.8, about 0.8 to less than 5, about 0.8 to less than 4, about 0.8 to less than 3, about 0.8 to less than 2, about 0.8 to less than 1.8, about 0.8 to less than 1.5, about 0.8 to less than 1.2, about 0.8 to less than 1, about 1 to less than 5, about 1 to less than 4, about 1 to less than 3, about 1 to less than 2, about 1 to less than 1.8, about 1 to less than 1.5, or about 1 to less than 1.2.

In one or more embodiments, the acid includes one or more organic acids and the polymeric composition is exposed to the acid to produce the swollen polymeric material. The organic acid is generated in situ the downhole environment and in the presence of the polymeric composition. The acid precursor is or includes one or more esters contained in the treatment fluid also including the polymeric composition. Once the treatment fluid is flowed to or otherwise introduced to the predetermined location within the downhole environment, the ester is hydrolyzed to generate the organic acid. In some examples, the acid can be formed or otherwise produced from the acid precursor via hydrolyzing the acid precursor. The acid precursor is maintained under subterranean conditions for a time of at least four half-lives of a hydrolysis reaction of the acid precursor to produce the acid.

The acid precursor can be or include, but is not limited to, one or more of substituted or unsubstituted $(C_1$-$C_{20})$hydrocarbyl esters of substituted or unsubstituted $(C_1$-$C_{20})$alkanoic acids, homo- or hetero-anhydrides of substituted or unsubstituted $(C_1$-$C_{20})$alkanoic acids, or any combination thereof. More specifically, in some embodiments, the acid precursor can be or include, but is not limited to, one or more of $(C_1$-$C_5)$alkyl esters of substituted or unsubstituted $(C_1$-$C_5)$alkanoic acids, $(C_1$-$C_5)$alkyl esters or anhydrides of mono- or poly-hydroxy substituted $(C_1$-$C_5)$alkanoic acids, or any combination thereof. In some examples, the acid precursor can be or include substituted or unsubstituted $(C_1$-$C_{20})$hydrocarbyl esters or anhydrides of at least one of formic acid, acetic acid, lactic acid, glycolic acid, propionic acid, or any combination thereof. For example, the acid precursor can be or include one or more polyethylene glycol di($C_1$-$C_5$)alkanoates. In other examples, the acid precursor can be or include at least one of diethylene glycol diformate, ethylene glycol monoformate, ethyl lactate, ethyl formate, methyl formate, glycerin diacetate, methyl lactate, salts thereof, or any combination thereof.

In some embodiments, the acid precursor is triggered or activated to produce the acid in the downhole environment at a specified temperature. The acid precursor can be selected based on the temperature of the downhole environment to have a desired hydrolysis rate. Alternatively, a heater (e.g., steam generator) can be used to heat a portion of the downhole environment to a specified temperature in order to have a desired hydrolysis rate for the acid precursor. The temperature can be about 120° F., about 130° F., about 140° F., about 150° F., about 160° F., or about 170° F. to about 180° F., about 200° F., about 220° F., about 240° F., about 250° F., about 260° F., about 280° F., about 300° F., about 310° F., about 320° F., about 330° F., about 340° F., about 350° F., or greater. For example, the temperature can be about 120° F. to about 350° F., about 120° F. to about 330° F., about 120° F. to about 300° F., about 120° F. to about 290° F., about 120° F. to about 280° F., about 120° F. to about 250° F., about 120° F. to about 220° F., about 150° F. to about 350° F., about 150° F. to about 330° F., about 150° F. to about 300° F., about 150° F. to about 290° F., about 150° F. to about 280° F., about 150° F. to about 250° F., about 150° F. to about 220° F., about 180° F. to about 350° F., about 180° F. to about 330° F., about 180° F. to about 300° F., about 180° F. to about 290° F., about 180° F. to about 280° F., about 180° F. to about 250° F., or about 180° F. to about 220° F.

Figure 2:
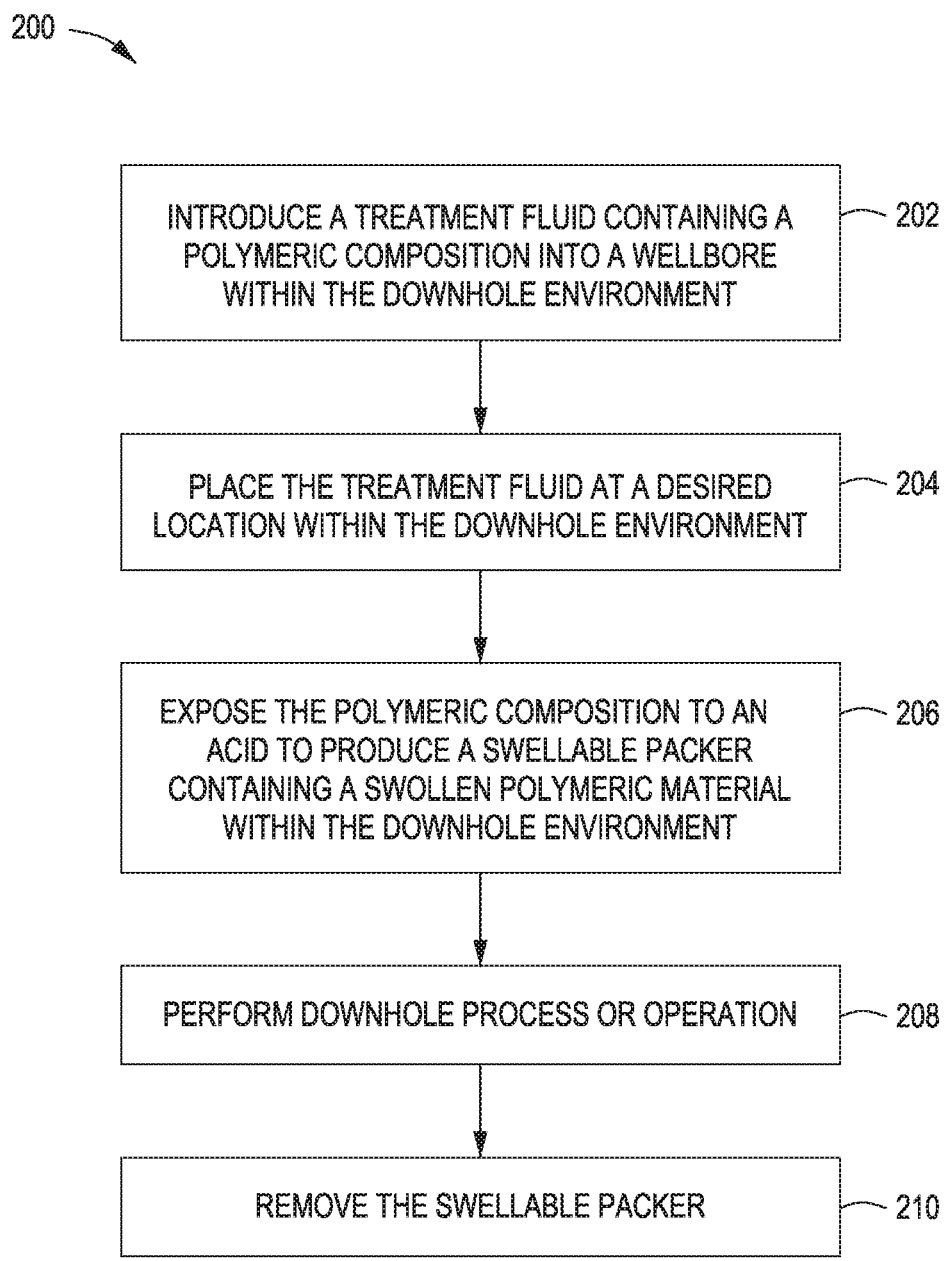
FIG. 2 is a flow chart depicting a method for producing a swellable packer in a downhole environment, according to one or more embodiments.

FIG. 2 is a flow chart depicting method 200 used to produce and utilize a swellable packer in a downhole environment during an operation, such as a drilling operation or other downhole operations. At 202, a treatment fluid containing a polymeric composition of the swellable packer is pumped or otherwise introduced into a downhole environment via a wellbore. The swellable packer is used in subterranean formations, fractures, wellbores or boreholes, tubulars, passageways thereof, and many other downhole environments and locations. The swellable packer can be used to eliminate loss of drilling fluid while drilling which is an inevitable part of drilling operation that causes the non-productive time. Typically, the drilling of subterranean formations, especially carbonate formations, is difficult since the subterranean formations may be naturally highly fragile and easily fractured by a rotating drill bit or other tool. The subterranean formations have the complex porosity and permeability variations with irregular fluid flow paths. Carbonate formations tend to break or crack when the drilling bit makes contact to the subterranean formation during a drilling operation. If the swellable packer is not utilized in the downhole environment, partial or complete loss of drilling fluid can be encountered when drilling into these types of subterranean formations.

At 204, the treatment is placed at one or more desired locations within the downhole environment. The desired locations can be or include, but are not limited to, one or more of fractures, cracks, and/or other passageways in the subterranean formation, wellbore or borehole, and/or tubular.

At 206, the polymeric composition is exposed to one or more acids to produce a swellable packer containing a swollen polymeric material within the downhole environment. The swellable packer containing the polymeric composition is triggered or otherwise activated to swell and produce a swelled packer at the desired time and location. In some examples, the swellable packer is activated by one or more acids contained in the treatment fluid, already at the desired location, and/or introduced after the treatment fluid is at the desired location. In other examples, the swellable packer is activated by one or more acids generated downhole in situ from one or more acid precursors. In some examples, the acid precursor is contained in the treatment fluid and introduced to the desired downhole location at the same time. In other examples, the acid precursor and the treatment fluid are introduced to the desired downhole location independent of each other. For example, the acid precursor can be introduced to the desired downhole location before or after the treatment fluid.

The polymeric composition of the swellable packer is exposed to one or more acids to produce a swollen polymeric material within the downhole environment. The acid can be generated in situ downhole from one or more acid precursors. Thereafter, once activated by the acid, the swollen polymeric material makes contact with the subterranean formation (e.g., carbonate formation) within the passageway and forms a plug blocking or greatly reducing fluid communication between the passageway and the wellbore. Any designated segments or portions of the subterranean formation, wellbore or borehole, and/or tubular are at least partially or completely plugged or otherwise sealed by the swollen packer.

As used herein, the terms "swell," "swellable," or "swollen" means an increase in volume through molecular incorporation of one or more fluids within a component or material of the swellable packer or the polymeric composition. For example, terms used to describe the component or material of the swellable packer or the polymeric composition can be or include, but is not limited to, "swellable packer," "swellable material," "swellable polymeric composition," "swellable polymeric material," "swellable polymer," "swellable elastomer," "swollen packer," or "swollen polymeric material."

The swellable packer or the polymeric composition can remain dormant until activated by or contacted with one or more acids or other activation agents. The swelling or expanding of the swellable packer or the polymeric composition to be expanded may occur through contact with an acid that is sent downhole into the downhole environment as an acid. Alternatively, the swelling or expanding of the swellable packer or the polymeric composition to be expanded may occur through contact with one or more acids that are generated in situ downhole by triggering or otherwise activating one or more acid precursors in the downhole environment. Once activated and at least partially or completely expanded, the swellable packer or the polymeric composition forms a fluid-tight seal when in sealing engagement with the inner surfaces of the fractures, boreholes, or other features within the downhole environment.

At 208, one or more downhole processes or operations are performed in the downhole environment. Once the designated segments or portions of the subterranean formation, wellbore or borehole, and/or tubular are at least partially or completely plugged or otherwise sealed by the swollen packer, the downhole process or operation in the remaining opened or accessible portions of the subterranean formation, wellbore or borehole, and/or tubular are started or continued. The downhole processes or operations can be or include, but are not limited to, drilling, production (e.g., oil and/or gas production), pumping, surveying, fracturing, or any combination thereof.

At 210, once the downhole process or operation is complete or at another phase, the swellable packer is removed from the downhole environment. The swellable packer can be removed by several different ways including a reverse swelling process or by chemically breaking down the swollen polymeric material, such as by oxidation. The swelling of the swellable packer may be reduced by increasing the pH of the fluid in the downhole environment around the swollen polymeric material of the packer. The pH of the fluid is increased by introducing one or more alkaline agents into the downhole environment. The swollen polymeric material is exposed to the alkaline agents to reduce or eliminate the swollenness of the material and the packer. The alkaline agent can be or include, but is not limited to, one or more hydroxides, carbonates, bicarbonates, amines, or any combination thereof. Exemplary alkaline agents can be or include, but are not limited to, one or more sodium hydroxide, potassium hydroxide, lithium hydroxide, cesium hydroxide, magnesium hydroxide, calcium hydroxide, ammonium hydroxide, magnesium carbonate, calcium carbonate, sodium bicarbonate, potassium bicarbonate, lithium bicarbonate, cesium bicarbonate, trimethyl amine, triethyl amine, salts thereof, hydrates thereof, or any combination thereof.

During the reverse swelling process, the pH of the treatment or other downhole fluid that is in contact with the swollen polymeric material is increased in order to decrease the swollenness of the swellable packer. The pH of the fluid can be greater than 5, such as greater than 6, greater than 7, or greater than 8. The pH of the fluid in contact to the swollen polymeric material is about 5, about 6, about 6.5, or about 7 to about 7.5, about 8, about 8.5, about 9, about 9.5, about 10, about 10.5, about 11, about 12, about 13, or greater during the reverse swelling process. For example, the pH of the fluid in contact to the swollen polymeric material is about 5 to about 13, about 5 to about 12, about 6 to about 12, about 6.5 to about 12, about 7 to about 12, about 7.5 to about 12, about 8 to about 12, about 8.5 to about 12, about 9 to about 12, about 9.5 to about 12, about 10 to about 12, about 11 to about 12, about 6 to about 7, about 6 to about 8, about 6 to about 9, about 6 to about 10, about 6.5 to about 10, about 7 to about 10, about 7.5 to about 10, about 8 to about 10, about 8.5 to about 10, about 9 to about 10, or about 9.5 to about 10 during the reverse swelling process.

The swollen polymeric material is exposed to an oxidizing agent to break down or apart the swollen polymeric material into smaller pieces. The swollen polymeric material is chemically altered, such as by oxidizing any portion of the monomers, the comonomers, the crosslinkers, and/or the activating agents. The oxidizing agent can be or include, but is not limited to, one or more inorganic peroxide, organic peroxide, oxidizing acids, organic oxidizers, in situ generated oxidizers (e.g., oxidizer precursor), salts thereof, or any combination thereof. Exemplary oxidizing agents can be or include, but are not limited to, one or more hydrogen peroxide, calcium peroxide, nitric acid, salts thereof, or any combination thereof.

Experimental Section

Example 1: Synthesis of Polymeric Composition

About 20 g of N,N-dimethylaminoethyl methacrylate (DMAEMA), about 0.65 g of ethylene glycol dimethacrylate (EDGMA), and about 3.4 g of styrene were mixed together in a reaction vessel until combined. The composition of the mixture contained about 78 mol % of DMAEMA, about 20 mol % of styrene, and about 2 mol % of EGDMA. About 0.27 g (about 1 mol %, based on total moles of DMAEMA, styrene, and EGDMA) of azobisisobutyronitrile (AIBN) was added to the mixture in the reaction vessel. The mixture was purged with nitrogen gas for about 15 min and then the reaction vessel containing the mixture was sealed. The reaction vessel was heated at a temperature of about 158° F. (about 70° C.) for about 20 hours to form a cross-linked, crude polymeric product. Thereafter, the crude polymeric product was repeatedly washed with about 200 mL of methanol three times to remove unreacted reagents and byproducts. The purified polymeric product was a white free flowing powder which was ground to make very fine particles that provided a total yield of about 95 wt %.

Example 2: Polymeric Composition and Organic Acid

This experiment was carried out to evaluate polymer response in acidic environment. About 1 g of the polymeric composition produced in EX. 1 and about 20 mL of formic acid (about 2% v/v) were added to a test tube. The mixture had a pH of about 1.5 to about 2.5. The polymer swelling was observed in the test tube over a period of about 2 hrs at room temperature (about 23° C.). This indicates that the polymer is interacting with the formic acid.

Example 3: Polymeric Composition and Acid Precursor

This experiment was carried out to test if we can delay/control the polymer swelling. About 1 g of the polymeric composition produced in EX. 1 and about 20 mL of acid precursor solution (38% v/v diethylene glycol diformate in water) were added to a test tube. The mixture had a pH of about 6 to 6.5. The acid precursor has activated by gradual heating the solution to a temperature of about 60° C. to generate acid through ester hydrolysis. Delayed polymer swelling was observed. Polymer swelling increased gradually with time. The complete polymer swelling was observed after 10 hrs. This indicates that selective control and delay of polymer swelling response is achieved through selecting different organic esters with desired hydrolysis kinetics.

Example 4: Polymeric Composition and Carbon Dioxide

This experiment was carried out to evaluate interaction of polymer composition with the carbon dioxide gas. About 1 g of polymeric composition produced in EX. 1 and about 20 mL of tap water having a pH of about 7.2 were combined in a container. The mixture was exposed to a stream of carbon dioxide gas by purging the container with carbon dioxide at a pressure of about 700 psi at room temperature (about 23° C.) for about 4 hrs. Polymer swelling was observed indicating the interaction of $CO_2$ gas with the polymeric composition.

Example 5: Polymeric Composition in Calcium Carbonate Environment Exposed to Formic Acid This test was carried out to mimic how polymer swells and blocks/plugs the fluid flow in the carbonate formation. About 10 g of calcium carbonate powder was placed in a vial to form calcium carbonate bed. About 0.5 g to about 1 g of polymeric composition produced from example 1 was layered so as to cover the surface of carbonate bed. About 30 mL of formic acid solution (about 5% v/v in water) was slowly poured on the surface of the polymer. The polymer swelling was observed immediately with minimum reaction of calcium carbonate with the added formic acid. The control experiment was carried as follows. To about 10 g of calcium carbonate formed as a bed, about 30 mL of formic acid solution (about 5% v/v in water) was added. All the calcium carbonate reacted with the added formic acid resulting into carbon dioxide evolution and consumption of all of the calcium carbonate.

Example 6: Polymeric Composition in Calcium Carbonate Environment Exposed to Hydrochloric Acid This test was carried out to mimic how polymer swells and blocks/plugs the fluid flow in the carbonate formation. About 10 g of calcium carbonate powder was placed in a vial to form calcium carbonate bed. About 0.5 g to about 1 g of polymeric composition produced from example 1 was layered so as to cover the surface of carbonate bed. About 30 mL of hydrochloric acid solution (about 15% in water) was slowly poured on the surface of the polymer. The polymer swelling was observed immediately with minimum reaction of calcium carbonate with the added hydrochloric acid. The control experiment was carried as follows. To about 10 g of calcium carbonate formed as a bed, about 30 mL of hydrochloric acid solution (about 15% in water) was added. All the calcium carbonate reacted with the added hydrochloric acid resulting into carbon dioxide evolution and consumption of all of the calcium carbonate.

Example 7: De-swelling of Swollen Polymeric Composition in an Alkaline Environment This experiment was carried out to evaluate the de-swelling capability of swollen polymer composition. About 5 g of swelled polymeric composition was placed into a test tube and about 50 mL of sodium hydroxide solution (2% w/v sodium hydroxide in water) was added to the test tube. The swollen polymer slowly deswells with time, such as about 10% after about 180 mins, and about 25% after about 300 mins. The timing of the de-swelling is controlled by varying the concentration of the alkaline solution.

In addition to the embodiments described above, embodiments of the present disclosure further relate to one or more of the following paragraphs 1-32:

1. A method for producing a swellable packer in a downhole environment, comprising: introducing a treatment fluid comprising a polymeric composition into a wellbore within the downhole environment and exposing the polymeric composition to an acid to produce a swollen polymeric material within the downhole environment, wherein the polymeric composition comprises a reaction product of at least one or more monomers, one or more comonomers, and one or more crosslinkers. The monomer has the chemical formula:

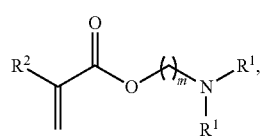

wherein: each $R^1$ is independently a $C_1$-$C_{10}$ alkyl, $R^2$ is a substituted or unsubstituted linear, branched, cyclic, heterocyclic, or aromatic hydrocarbyl group, and m is an integral in a range from 1 to 5; the comonomer has the chemical formula: $R^3$—CH=CH$_2$, wherein: $R^3$ is a substituted or unsubstituted linear, branched, cyclic, heterocyclic, or aromatic hydrocarbyl group; and the crosslinker has the chemical formula:

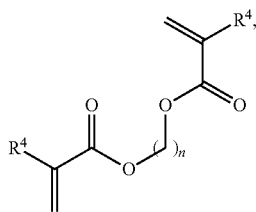

wherein: each $R^4$ is independently a substituted or unsubstituted linear, branched, cyclic, heterocyclic, or aromatic hydrocarbyl group; and n is an integral in a range from 1 to 5.

2. The method of paragraph 1, further comprising forming an acid from an acid precursor within the downhole environment.

3. A method for producing a swellable packer in a downhole environment, comprising: introducing a treatment fluid comprising a polymeric composition and an acid precursor into a wellbore within the downhole environment; forming an acid from the acid precursor within the downhole environment; and exposing the polymeric composition to the acid to produce a swollen polymeric material within the downhole environment, wherein the polymeric composition comprises a reaction product of at least: the monomer of paragraph 1, the comonomer of paragraph 1, and the crosslinker of paragraph 1.

4. A method for producing a swellable packer in a downhole environment, comprising: introducing a treatment fluid comprising a polymeric composition and an acid precursor into a wellbore within the downhole environment; forming an acid from the acid precursor within the downhole environment; exposing the polymeric composition to the acid to produce a swollen polymeric material within the downhole environment; forming a plug comprising the swollen polymeric material, wherein the downhole environment comprises a formation comprising a passageway, wherein the plug is in contact with the formation within the passageway and blocks fluid communication between the passageway and the wellbore; perform a drilling or production process in the wellbore; and subsequently exposing the swollen polymeric material to an alkaline or oxidizing agent to remove the plug and open fluid communication between the passageway and the wellbore, wherein the polymeric composition comprises a reaction product of at least: the monomer of paragraph 1, the comonomer of paragraph 1, and the crosslinker of paragraph 1.

5. A composition for a swellable packer in a downhole environment, comprising: a polymeric composition comprising a reaction product of at least the monomer of paragraph 1, the comonomer of paragraph 1, and the crosslinker of paragraph 1.

6. The method or composition according to any one of paragraphs 1-5, wherein the downhole environment comprises a formation comprising a passageway, and wherein the swollen polymeric material is in contact with the formation within the passageway and forms a plug blocking fluid communication between the passageway and the wellbore.

7. The method or composition of paragraph 6, further comprising exposing the swollen polymer to an alkaline agent to reduce the swollenness of the swollen polymer and open the fluid communication between the passageway and the wellbore.

8. The method or composition of paragraph 6, further comprising exposing the swollen polymer to an oxidizing agent to break apart the swollen polymer into smaller pieces and open the fluid communication between the passageway and the wellbore.

9. The method or composition according to any one of paragraphs 1-8, wherein the formation comprises a carbonate formation.

10. The method or composition according to any one of paragraphs 1-9, wherein the monomer has the chemical formula:

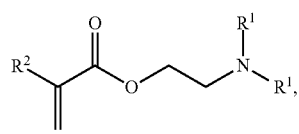

and wherein: each $R^1$ is independently a $C_1$-$C_5$ alkyl, and $R^2$ is a $C_1$-$C_5$ alkyl, a phenyl, or an aryl.

11. The method or composition of paragraph 10, wherein each $R^1$ and $R^2$ is independently a $C_1$-$C_3$ alkyl, and wherein $R^3$ is a phenyl, an aryl, or a $C_1$-$C_{10}$ alkyl.

12. The method or composition of paragraph 11, wherein $R^1$ and $R^2$ are methyl, and wherein $R^3$ is a phenyl.

13. The method or composition according to any one of paragraphs 1-12, wherein the crosslinker has the chemical formula:

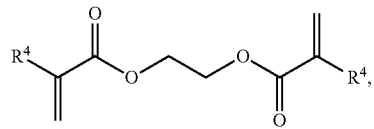

and wherein each $R^4$ is independently a $C_1$-$C_5$ alkyl, a phenyl, or an aryl.

14. The method or composition of paragraph 13, wherein $R^4$ is methyl.

15. The method or composition according to any one of paragraphs 1-14, wherein the polymeric composition is produced by reacting together: about 65 mol % to about 90 mol % of the monomer, about 10 mol % to about 30 mol % of the comonomer, and about 0.5 mol % to about 5 mol % of the crosslinker.

16. The method or composition of paragraph 15, wherein the polymeric composition is produced by reacting together: about 75 mol % to about 82 mol % of the monomer, about 15 mol % to about 25 mol % of the comonomer, and about 1 mol % to about 3 mol % of the crosslinker.

17. The method or composition according to any one of paragraphs 1-16, wherein the polymeric composition is produced by reacting the monomer, the comonomer, the crosslinker, and a radical initiator.

18. The method or composition of paragraph 17, wherein the radical initiator comprises azobisisobutyronitrile, benzoyl peroxide, potassium persulfate, salts thereof, or any combination thereof.

19. The method or composition of paragraph 17, wherein the polymeric composition is produced by reacting about 0.2 mol % to about 3 mol % of the radical initiator, based on the total moles of the monomer, the comonomer, and the cross-linker.

20. The method or composition according to any one of paragraphs 1-19, wherein the acid comprises an organic acid selected from the group consisting of formic acid, acetic acid, propionic acid, butyric acid, valeric acid, critic acid, oxalic acid, lactic acid, malic acid, uric acid, glutaric acid, glutamic acid, glycolic acid, malonic acid, tartaric acid, adipic acid, sulfamic acid, chloroacetic acid, phthalic acid, benzoic acid, a sulfonic acid, a phosphonic acid, salts thereof, esters thereof, and any combination thereof.

21. The method or composition according to any one of paragraphs 1-20, wherein the acid comprises an inorganic acid selected from the group consisting of hydrochloric acid, perchloric acid, sulfuric acid, sulfurous acid, phosphoric acid, phosphorous acid, hypophosphorous acid, hydrofluoric acid, hydrobromic acid, nitric acid, salts thereof, esters thereof, and any combination thereof.

22. The method or composition according to any one of paragraphs 1-21, wherein the acid comprises a pH of about 0.5 to about 5.

23. The method or composition according to any one of paragraphs 1-22, wherein the acid comprises an organic acid, and wherein the polymeric composition is exposed to the organic acid produce the swollen polymeric material.

24. The method or composition of paragraph 23, wherein the organic acid is generated in situ the downhole environment and in the presence of the polymeric composition.

25. The method or composition of paragraph 24, wherein an ester is hydrolyzed to generate the organic acid.

26. The method or composition according to any one of paragraphs 2-25, wherein the forming the acid from the acid precursor comprises hydrolyzing the acid precursor by maintaining the acid precursor under subterranean conditions for a time of at least about 4 half-lives of a hydrolysis reaction of the acid precursor to produce the acid.

27. The method or composition according to any one of paragraphs 2-26, wherein the acid precursor comprises: a substituted or unsubstituted $(C_1-C_{20})$hydrocarbyl ester of a substituted or unsubstituted $(C_1-C_{20})$alkanoic acid; a homo- or hetero-anhydride of a substituted or unsubstituted $(C_1-C_{20})$alkanoic acid; or a combination thereof.

28. The method or composition according to any one of paragraphs 2-27, wherein the acid precursor comprises a $(C_1-C_5)$alkyl ester of a substituted or unsubstituted $(C_1-C_5)$alkanoic acid; a $(C_1-C_5)$alkyl ester or anhydride of a mono- or poly-hydroxy substituted $(C_1-C_5)$alkanoic acid; or a combination thereof.

29. The method or composition according to any one of paragraphs 2-28, wherein the acid precursor comprises a substituted or unsubstituted $(C_1-C_{20})$hydrocarbyl ester or anhydride of at least one of formic acid, acetic acid, lactic acid, glycolic acid, propionic acid, or any combination thereof.

30. The method or composition according to any one of paragraphs 2-29, wherein the acid precursor comprises a polyethylene glycol di$(C_1-C_5)$alkanoate.

31. The method or composition according to any one of paragraphs 2-30, wherein the acid precursor comprises at least one of diethylene glycol diformate, ethylene glycol monoformate, ethyl lactate, ethyl formate, methyl formate, glycerin diacetate, methyl lactate, or any combination thereof.

32. A system for performing the method of any one of paragraphs 1-4 and 6-31, the system comprising a tubular disposed in the downhole environment and a pump configured to pump the treatment fluid into the downhole environment through the tubular.

One or more specific embodiments of the present disclosure have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

In the following discussion and in the claims, the articles "a," "an," and "the" are intended to mean that there are one or more of the elements. The terms "including," "comprising," and "having" and variations thereof are used in an open-ended fashion, and thus should be interpreted to mean "including, but not limited to . . . ." Also, any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. The use of "top," "bottom," "above," "below," "upper," "lower," "up," "down," "vertical," "horizontal," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method for producing a swellable packer within a wellbore from a ground surface through a formation in a downhole environment, comprising:
introducing a treatment fluid comprising a polymeric composition into the wellbore, wherein the polymeric composition comprises a reaction product of at least:
a monomer having the chemical formula:

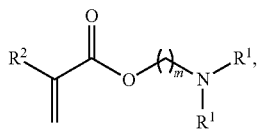

wherein:
each $R^1$ is independently a $C_1$-$C_{10}$ alkyl,
$R^2$ is a substituted or unsubstituted linear, branched, cyclic, heterocyclic, or aromatic hydrocarbyl group, and
m is an integral in a range from 1 to 5;
a comonomer having the chemical formula:

$R^3$—CH=CH$_2$, wherein:
$R^3$ is a substituted or unsubstituted linear, branched, cyclic, heterocyclic, or aromatic hydrocarbyl group; and
a crosslinker having the chemical formula:

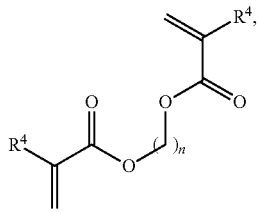

wherein:
each $R^4$ is independently a substituted or unsubstituted linear, branched, cyclic, heterocyclic, or aromatic hydrocarbyl group; and
n is an integral in a range from 1 to 5; and
exposing the polymeric composition to an acid introduced into the wellbore from the ground surface or produced from an acid precursor to produce a swollen polymeric material to produce the swellable packer within the downhole environment.

2. The method of claim 1, wherein the formation comprises a passageway, and wherein the swollen polymeric material is in contact with the formation within the passageway and forms a plug blocking fluid communication between the passageway and the wellbore.

3. The method of claim 2, further comprising exposing the swollen polymer to an alkaline agent to reduce the swollenness of the swollen polymer and open the fluid communication between the passageway and the wellbore.

4. The method of claim 2, further comprising exposing the swollen polymer to an oxidizing agent to break apart the swollen polymer into smaller pieces and open the fluid communication between the passageway and the wellbore.

5. The method of claim 1, wherein the monomer has the chemical formula:

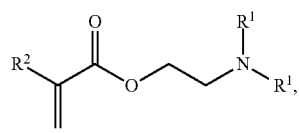

and
wherein:
each $R^1$ is independently a $C_1$-$C_5$ alkyl, and
$R^2$ is a $C_1$-$C_5$ alkyl, a phenyl, or an aryl.

6. The method of claim 5, wherein each $R^1$ and $R^2$ is independently a $C_1$-$C_3$ alkyl, and wherein $R^3$ is a phenyl, an aryl, or a $C_1$-$Ci_{10}$ alkyl.

7. The method of claim 1, wherein the crosslinker has the chemical formula:

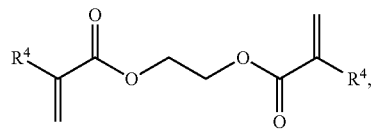

and
wherein each $R^4$ is independently a $C_1$-$C_5$ alkyl, a phenyl, or an aryl.

8. The method of claim 1, wherein the polymeric composition is produced by reacting together:
about 65 mol% to about 90 mol% of the monomer,
about 10 mol% to about 30 mol% of the comonomer, and
about 0.5 mol% to about 5 mol% of the crosslinker.

9. The method of claim 1, wherein the polymeric composition is produced by reacting the monomer, the comonomer, the crosslinker, and a radical initiator.

10. The method of claim 1, wherein the acid comprises an organic acid, and wherein the polymeric composition is exposed to the organic acid to produce the swollen polymeric material.

11. The method of claim 10, wherein the organic acid is generated in situ the downhole environment and in the presence of the polymeric composition.

12. A method for producing a swellable packer in a downhole environment, comprising:
introducing a treatment fluid comprising a polymeric composition and an acid precursor into a wellbore within the downhole environment, wherein the polymeric composition comprises a reaction product of at least:

a monomer having the chemical formula:

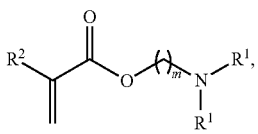

wherein:
  each $R^1$ is independently a $C_1$-$C_{10}$ alkyl,
  $R^2$ is a substituted or unsubstituted linear, branched, cyclic, heterocyclic, or aromatic hydrocarbyl group, and
  m is an integral in a range from 1 to 5;
a comonomer having the chemical formula:

wherein:
  $R^3$ is a substituted or unsubstituted linear, branched, cyclic, heterocyclic, or aromatic hydrocarbyl group; and
a crosslinker having the chemical formula:

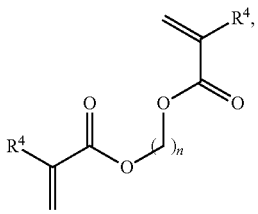

wherein:
  each $R^4$ is independently a substituted or unsubstituted linear, branched, cyclic, heterocyclic, or aromatic hydrocarbyl group; and
  n is an integral in a range from 1 to 5;
forming an acid from the acid precursor within the downhole environment; and
exposing the polymeric composition to the acid to produce a swollen polymeric material within the downhole environment.

13. The method of claim 12, wherein the downhole environment comprises a formation comprising a passageway, and wherein the swollen polymeric material is in contact with the formation within the passageway and forms a plug blocking fluid communication between the passageway and the wellbore.

14. The method of claim 13, further comprising exposing the swollen polymer to an alkaline agent to reduce the swollenness of the swollen polymer and open the fluid communication between the passageway and the wellbore.

15. The method of claim 13, further comprising exposing the swollen polymer to an oxidizing agent to break apart the swollen polymer into smaller pieces and open the fluid communication between the passageway and the wellbore.

16. The method of claim 12, wherein the acid precursor comprises:
  a substituted or unsubstituted ($C_1$-$C_{20}$)hydrocarbyl ester of a substituted or unsubstituted ($C_1$-$C_{20}$)alkanoic acid;
  a homo- or hetero-anhydride of a substituted or unsubstituted ($C_1$-$C_{20}$)alkanoic acid; or
  a combination thereof.

17. The method of claim 12, wherein the acid precursor comprises:
  a ($C_1$-$C_5$)alkyl ester of a substituted or unsubstituted ($C_1$-$C_5$)alkanoic acid;
  a ($C_1$-$C_5$)alkyl ester or anhydride of a mono- or polyhydroxy substituted ($C_1$-$C_5$)alkanoic acid; or
  a combination thereof.

18. The method of claim 12, wherein the acid precursor comprises a substituted or unsubstituted ($C_1$-$C_{20}$)hydrocarbyl ester or anhydride of at least one of formic acid, acetic acid, lactic acid, glycolic acid, propionic acid, or any combination thereof.

19. The method of claim 12, wherein the acid precursor comprises at least one of diethylene glycol diformate, ethylene glycol monoformate, ethyl lactate, ethyl formate, methyl formate, glycerin diacetate, methyl lactate, or any combination thereof.

20. A method for producing a swellable packer in a downhole environment, comprising:
  introducing a treatment fluid comprising a polymeric composition and an acid precursor into a wellbore within the downhole environment, wherein the polymeric composition comprises a reaction product of at least:
    a monomer having the chemical formula:

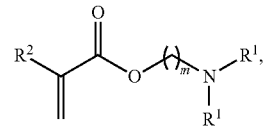

wherein:
    each $R^1$ is independently a $C_1$-$C_{10}$ alkyl,
    $R^2$ is a substituted or unsubstituted linear, branched, cyclic, heterocyclic, or aromatic hydrocarbyl group, and
    m is an integral in a range from 1 to 5;
  a comonomer having the chemical formula:

wherein:
    $R^3$ is a substituted or unsubstituted linear, branched, cyclic, heterocyclic, or aromatic hydrocarbyl group; and
  a crosslinker having the chemical formula:

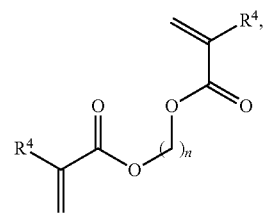

wherein:
    each $R^4$ is independently a substituted or unsubstituted linear, branched, cyclic, heterocyclic, or aromatic hydrocarbyl group; and
    n is an integral in a range from 1 to 5; and
  forming an acid from the acid precursor within the downhole environment;

exposing the polymeric composition to the acid to produce a swollen polymeric material within the downhole environment;

forming a plug comprising the swollen polymeric material, wherein the downhole environment comprises a formation comprising a passageway, wherein the plug is in contact with the formation within the passageway and blocks fluid communication between the passageway and the wellbore;

perform a drilling or production process in the wellbore; and subsequently exposing the swollen polymeric material to an alkaline or oxidizing agent to remove the plug and open fluid communication between the passageway and the wellbore.

* * * * *